US008503042B2

(12) United States Patent
Koning

(10) Patent No.: US 8,503,042 B2
(45) Date of Patent: Aug. 6, 2013

(54) IMAGING SYSTEM

(75) Inventor: Johannes Koning, Kronenberg (NL)

(73) Assignee: OCE-Technology B.V., Venlo (NL)

( * ) Notice: Subject to any disclaimer, the term of this patent is extended or adjusted under 35 U.S.C. 154(b) by 842 days.

(21) Appl. No.: 12/637,248

(22) Filed: Dec. 14, 2009

(65) Prior Publication Data

US 2010/0091343 A1 Apr. 15, 2010

Related U.S. Application Data

(63) Continuation of application No. PCT/EP2008/057141, filed on Jun. 9, 2008.

(30) Foreign Application Priority Data

Jun. 15, 2007 (EP) .................................... 07110398

(51) Int. Cl.
*H04N 1/04* (2006.01)

(52) U.S. Cl.
USPC ............ 358/474; 358/497; 358/498; 358/496

(58) Field of Classification Search
USPC .................................. 358/474, 497, 498, 496
See application file for complete search history.

(56) References Cited

U.S. PATENT DOCUMENTS 4,662,522 A 5/1987 Kokubun et al.
5,915,692 A 6/1999 Lu et al.
2005/0041268 A1 * 2/2005 Panini ........................... 358/474

FOREIGN PATENT DOCUMENTS

JP 03 128856 A 5/1991
JP 10-212063 A 8/1998

* cited by examiner

*Primary Examiner* — Houshang Safaipour
(74) *Attorney, Agent, or Firm* — Birch, Stewart, Kolasch & Birch, LLP

(57) ABSTRACT

An imaging station for processing a media includes a media output for outputting a processed media, a first media delivery station having a first media entrance, a second media delivery station having a second media entrance, and a passive urging device. The second media entrance has a width smaller than a width of the first media entrance. The second media entrance is positioned downstream from the media output and upstream from the first media entrance. The passive urging device is positioned downstream from the media output such that the media is urged towards the second media entrance.

14 Claims, 6 Drawing Sheets

IMAGING SYSTEM

CROSS-REFERENCE TO RELATED APPLICATIONS

This application is a Continuation of copending PCT International Application No. PCT/EP2008/057141 filed on Jun. 9, 2008, which designated the United States, and on which priority is claimed under 35 U.S.C. §120. PCT International Application No. PCT/EP2008/057141 claims priority to Application No. 07110398.0, filed in Europe on Jun. 15, 2007. The entire contents of each of the above-identified applications are hereby incorporated by reference.

FIELD OF THE INVENTION

The present invention relates to an imaging system comprising an imaging station for processing a media, the imaging station having a media output for outputting a processed media, and a first media delivery station having a first media entrance.

DESCRIPTION OF BACKGROUND ART

A device of this kind is known, for example from the Kyocera KM-3650w. This is a large format imaging system which releases the processed print media via an opening between the printer and the slide rack into a slide rack underneath the printer, where an operator may collect the processed media.

However, it is a disadvantage of this known device that the amount of breakage of the sliding motion of the processed media is not adapted to particulars of the processed media. Therefore the leading edge of a processed media experiences a large impact with the bottom of the slide rack. This may result in damaging the leading edge of the media or even in bouncing back out of the slide rack. Decelerating the sliding motion results in a softer impact of the leading edge of a heavy media, but may slow down lighter media too much, resulting in a blockage. This does significantly compromise the reliability of the imaging system.

SUMMARY OF THE INVENTION

It is an object of the present invention to provide an imaging system capable of handling a range of media having different widths. To this end an imaging system is provided with a second media delivery station having a second media entrance and a passive urging device. The second media entrance has a width smaller than a width of the first media entrance. The second media entrance is positioned downstream from the media output and upstream from the first media entrance. The passive urging device is positioned downstream from the media output such that the media is urged towards the second media entrance.

By passively separating processed media before guiding it to a user-reachable delivery position, the imaging system can adapt the characteristics of the motion towards the delivery position depending on the particulars of the processed media without increased complexity of the system.

In the present invention, a heavy weight wide format processed media is urged towards a small entrance. However, the heavy weight wide format processed media is guided to a delivery station with a wider entrance. The amount of slowing down may be adapted to the heavy weight of the media in the delivery station with the wider entrance. In addition, a light weight small media is urged successfully into a smaller delivery station, wherein the amount of slowing down the sliding motion of the media may be adapted to the lighter weight of small format media.

A processed media may be any media that is processed in the imaging system, e.g. a scanned original or a sheet of paper on which an image has been applied.

The delivery stations are structures in the imaging system, which handle the delivery of a processed media from an entrance to a target position, where the media can be taken out, e.g. by an operator. The motion of the media in the delivery station may, e.g. be induced by gravity forces acting on the media. The delivery station comprises an entrance adapted to allow media having an associated dimension up to a certain width to enter the delivery station. Media having a larger width is prevented from entering this delivery station and is guided to move further downstream of the media path, e.g. to a wider entrance of a further media delivery station.

A passive urging device provides an urging force on the processed media in the direction of the second (small format) entrance of the second (small format) delivery station. The force is adapted such that a media tries to enter into the entrance, but if the width of a media is larger than the maximum acceptable media width for that particular entrance, the media is guided further downstream without being forced into the entrance.

In another embodiment, the urging device is positioned adjacent to the second media entrance. By positioning the urge device close to the second media entrance, the construction of the imaging system remains small and the urging forces on the processed media may remain relatively small. The urge device may comprise a flap, e.g. a curved flap. By fixing the base of a slightly downward bent flap just above the media output, the free-end of the flap urges a released portion of the processed media exiting the media output towards the second media entrance. To prevent damage to the processed media caused by, for example, harsh forcing of the media towards the entrance, the flap is preferably flexible and should not impose too much mechanical resistance on the surface of the media, as this might cause smearing of the recently applied image.

In another embodiment, the width of the second media entrance is defined by a guiding device, such that processed media with a width larger than the width of the second media entrance are guided towards the first media entrance.

The entrance of the second media entrance has a limited dimension in the plane of the media in a direction perpendicular to the feeding direction. This width limitation corresponds to the maximum media size that is allowed to enter into the second delivery station. By defining the width of the second media entrance by a guiding device, such as for example a wire or rod network structure. This may for example be implemented as two smooth rods extending substantially from just under the media output to the base structure of the delivery station. This base structure may also be composed of the same type of wire or rod network, or alternatively for example of a sheet metal structure.

The width limiting construction of the entrance now also functions as a guide for processed media that has a larger width than the second media entrance.

In another embodiment, the first media delivery station comprises a chute extending substantially from the media output towards a user-reachable delivery position. The chute is constructed such that a processed media, which is released into the chute slides down to a user-reachable delivery position. This sliding motion is induced, e.g. by gravitational forces. The user-reachable delivery position may, for example, be a position at the front of the imaging system where an operator can pick up a printed document or set of documents. It is preferable that this position is easy to reach by the operator and that all documents of a set are delivered and not blocked in the delivery station. The second delivery station may as well comprise a further chute, extending substantially from the media output towards the user-reachable delivery position.

This user-reachable delivery position may be a further user-reachable delivery position or the same user-reachable delivery position as the delivery position of the first delivery station.

In another embodiment, the first and second media delivery stations comprise a media deceleration device that reduces the sliding motion of the processed media. Slowing down the sliding motion of the processed media reduces the risk of damaging the leading edge of the media upon impact with the bottom or abutment of the chute.

In a further embodiment, the media deceleration device is constructed such that the amount of deceleration in the first media delivery station is substantially different from the amount of deceleration in the second media delivery station. By adapting the amount of deceleration dependent on the width or corresponding weight of the media, the risk of blockage and/or bouncing out reduces. Heavyweight wide format media should be slowed down more than lightweight small format media. If lightweight small format media would be slowed down with the same amount of deceleration the media would get stuck on its way to the delivery position. On the other hand, if a heavyweight wide format media would get the same small amount of deceleration it would experience a very hard impact upon reaching the bottom or abutment at the delivery position. This could damage the leading edge of the media or even result in bouncing out of the delivery position onto the ground. This would both be very undesirable.

In another embodiment, the second media entrance is adapted to receive processed media up to and including DIN-A3 format. By separating media up to DIN-A3 sized sheets from larger heavier weight media, the handling from the media output to the delivery positioned can be sufficiently adapted to provide an appropriate handling of both categories. It will be clear that a cumulative stacking of selection entrances could provide an even more accurate handling and even reduced risks of damaging, bouncing and blocking. A cumulative stacking of selection entrances should be ordered from the smallest width near the media output to larger widths at more remote downstream locations.

In another embodiment, the first and second media delivery stations are positioned underneath the imaging station. By arranging respectively the selection entrances, the delivery stations, such as the chutes, and the delivery position from top to bottom in the direction of gravitation, all sliding motions of the released processed media can be completely passive. This decreases the mechanical and electronic complexity of this part of the system.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
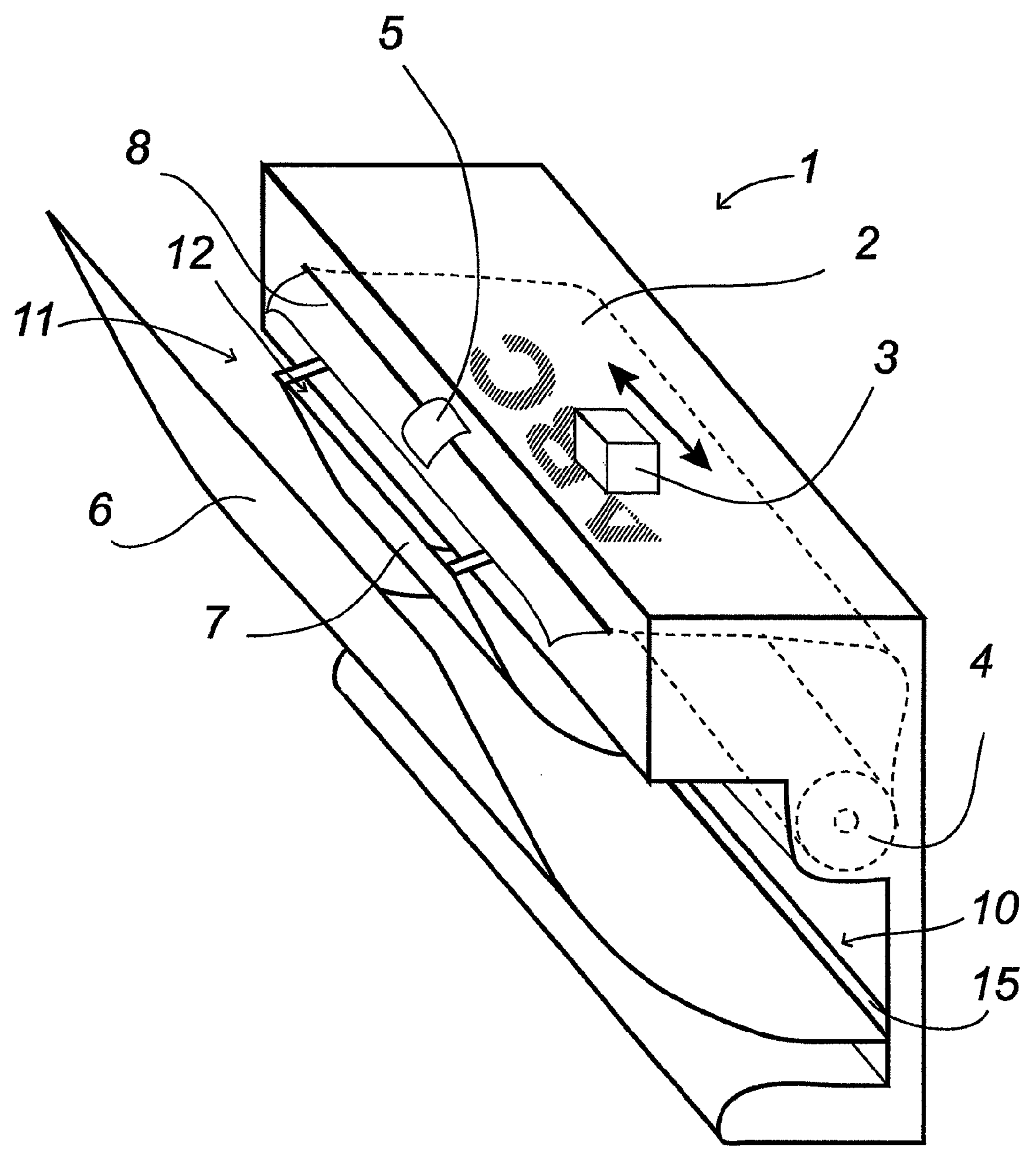
FIG. 1 illustrates the construction and operation of an imaging system, such as a printing system, according to the present invention.

FIG. 1 shows a printing system 1 according to the present invention. A wide format print media 2 is fed from a supply roll 4 towards an imaging station (e.g., printhead 3). An image is applied to the print media 2 at the imaging station by a scanning movement of the printhead 3. The printhead 3 is mounted on a carriage (not shown). The printhead 3 jets droplets of marking material onto the print media 2 in an image-wise fashion.

The processed print media is outputted via media output 8 by an internal media feed mechanism (not shown). A first media delivery station 6 and a second media delivery station 7 are located downstream of the media output 8. The media delivery stations 6, 7 include a support structure forming a first media chute (media station 6) and a second media chute (media station 7). The media chutes have entrances 11, 12 adjacent to the media output 8. The chutes extend towards a user-reachable delivery position 10. The user-reachable delivery position 10 comprises an abutment 15.

When the processed media exits the processing section of the printing system 1 via the media output 8, a passive urging device 5 urges the processed media downwards. The processed media first encounters the entrance 12 of the second delivery station 7 (second media chute). Since the processed media is too wide to enter into the entrance 12, the processed media is guided towards the next entrance 11 of the first delivery station 6 (first media chute) as shown in FIG. 2.

Figure 2:
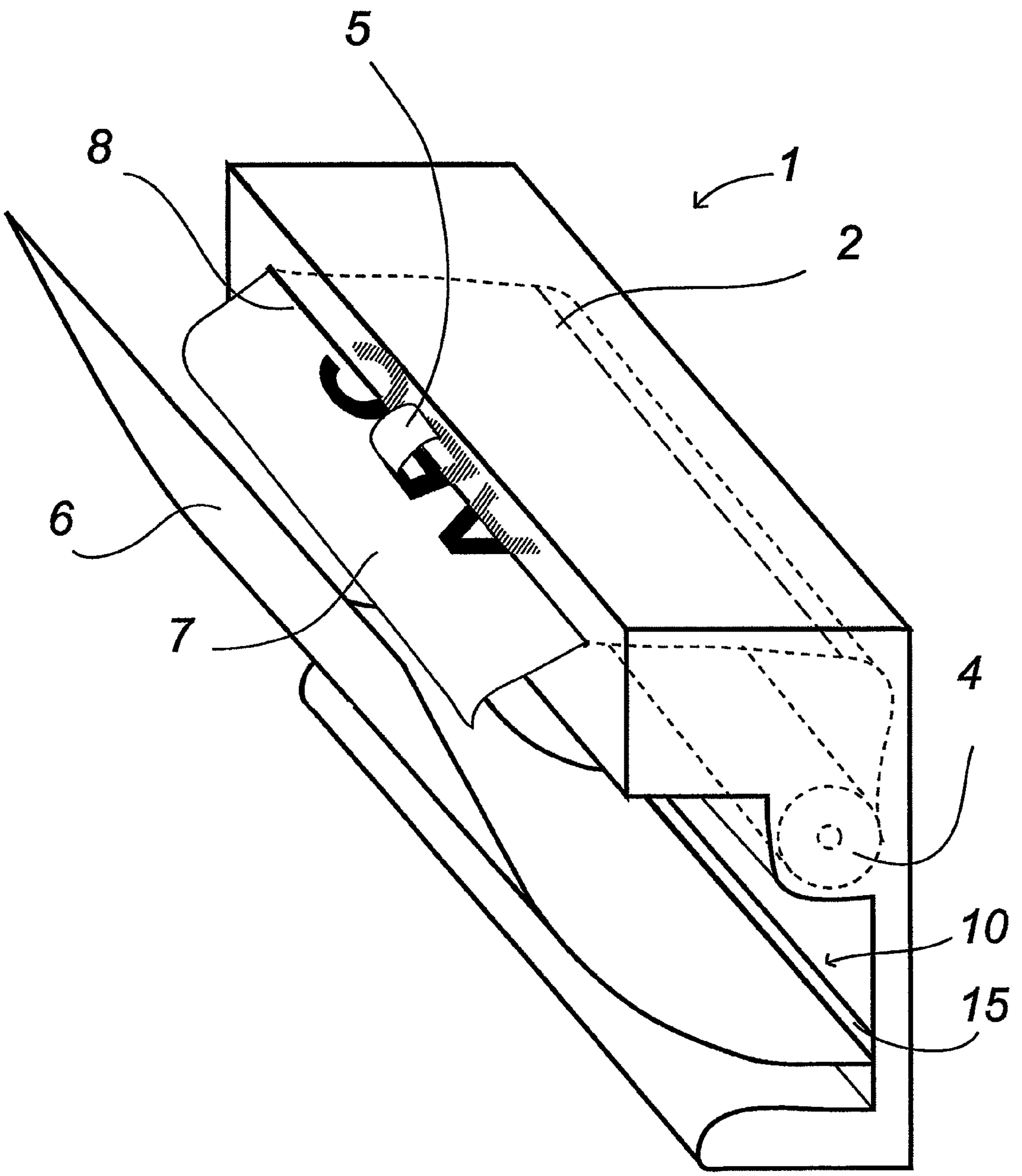
FIG. 2 illustrates how processed media exits the media output and enters into a first delivery station.

FIG. 2 shows how the processed media exits the media output 8, and guided by the support structure forming the second entrance 12, enters into the first delivery station 6 (first medial chute). An additional urging device (not shown) may assist the processed media into the entrance 11. When the complete image is applied onto the print media 2, the portion of the media 2 is cut loose from the supply roll 4 and completely released from the imaging portion of the printing system 1. Alternatively the image-receiving portion of the media 2 may be cut to suitable dimensions before the imaging operation is finished, or even before the imaging operation is started.

Figure 3:
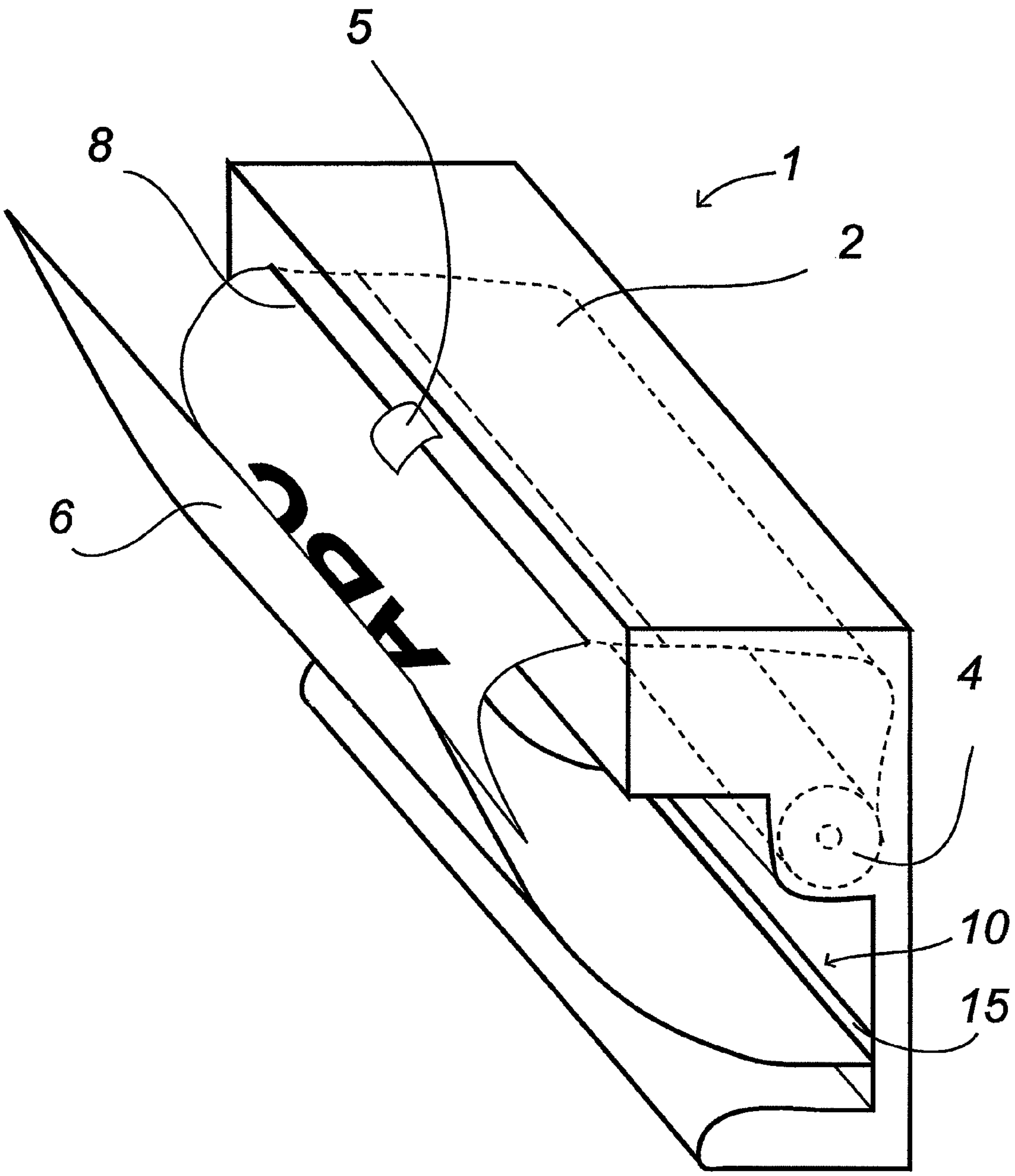
FIG. 3 illustrates how the processed media is released into the first delivery station.

FIG. 3 shows how the processed media is released into the first delivery station 6 (first media chute) via the entrance 11. The processed media slides through the chute towards abutment 15. Abutment 15 engages with the leading edge of the processed media and stops the sliding of the processed media at the user-reachable delivery position 10. During its slide through the first delivery station 6 (the first media chute), media a deceleration devices (not shown), positioned throughout the chute, slow the sliding movement of the processed media down such that the leading edge of the processed media is not damaged when the leading edge engages with the abutment 15. These media deceleration devices include curved flaps positioned such that the flaps do not disturb the motion but merely decelerate the movement of the processed media. An impact of the leading edge with the abutment 15 may result in a bouncing back of the media, if the movement is not moderated enough. This bouncing back may even result in a situation wherein the processed media looses contact with the chute and slides out via the backside of the printing system 1, resulting in an unorganized pile of processed sheets on the ground.

Figure 4:
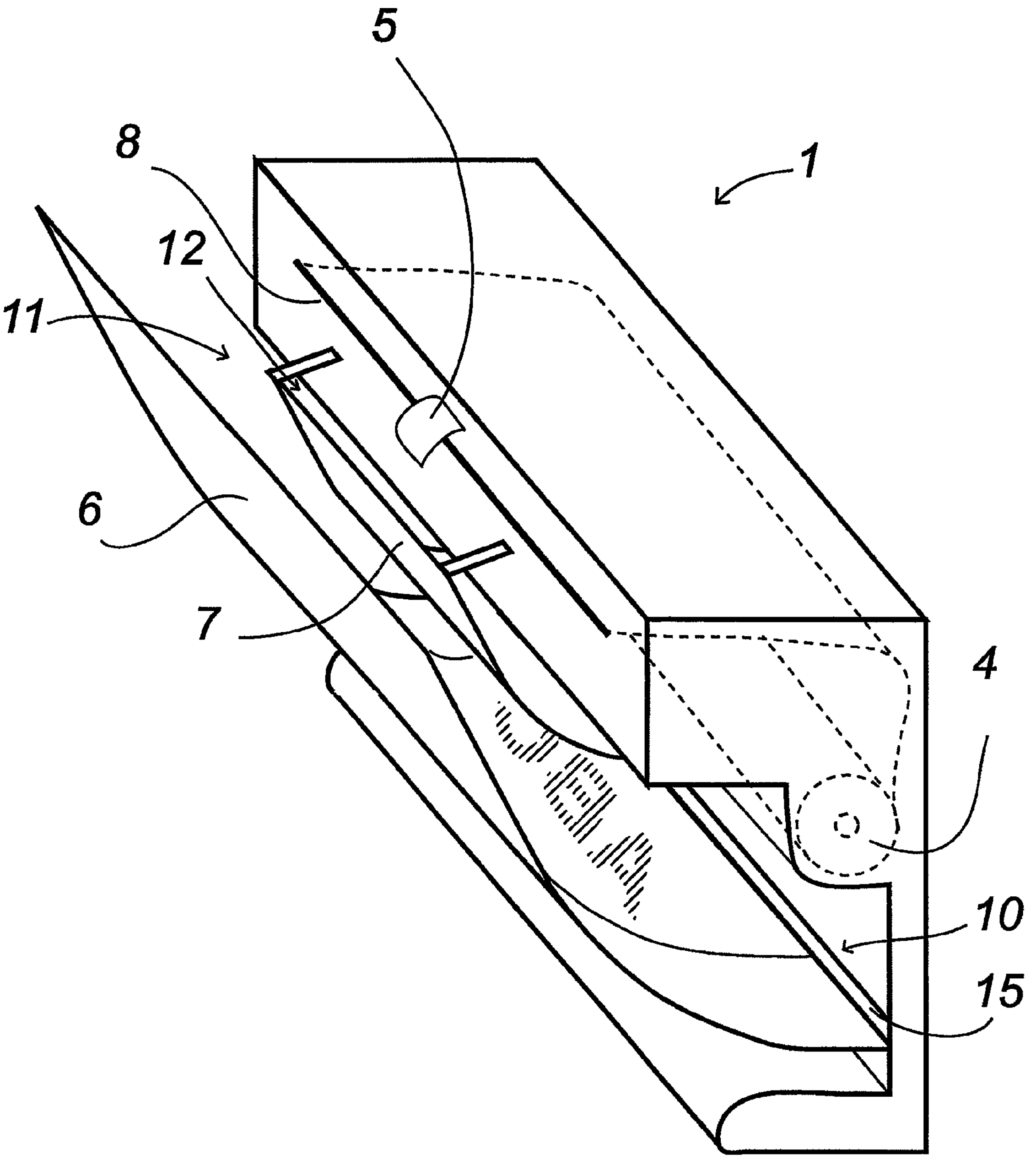
FIG. 4 illustrates a final rest position of the processed media laying against an abutment at a user-reachable delivery position.

FIG. 4 shows the final rest position of the processed media laying against the abutment 15 at the user-reachable delivery position 10.

Figure 5:
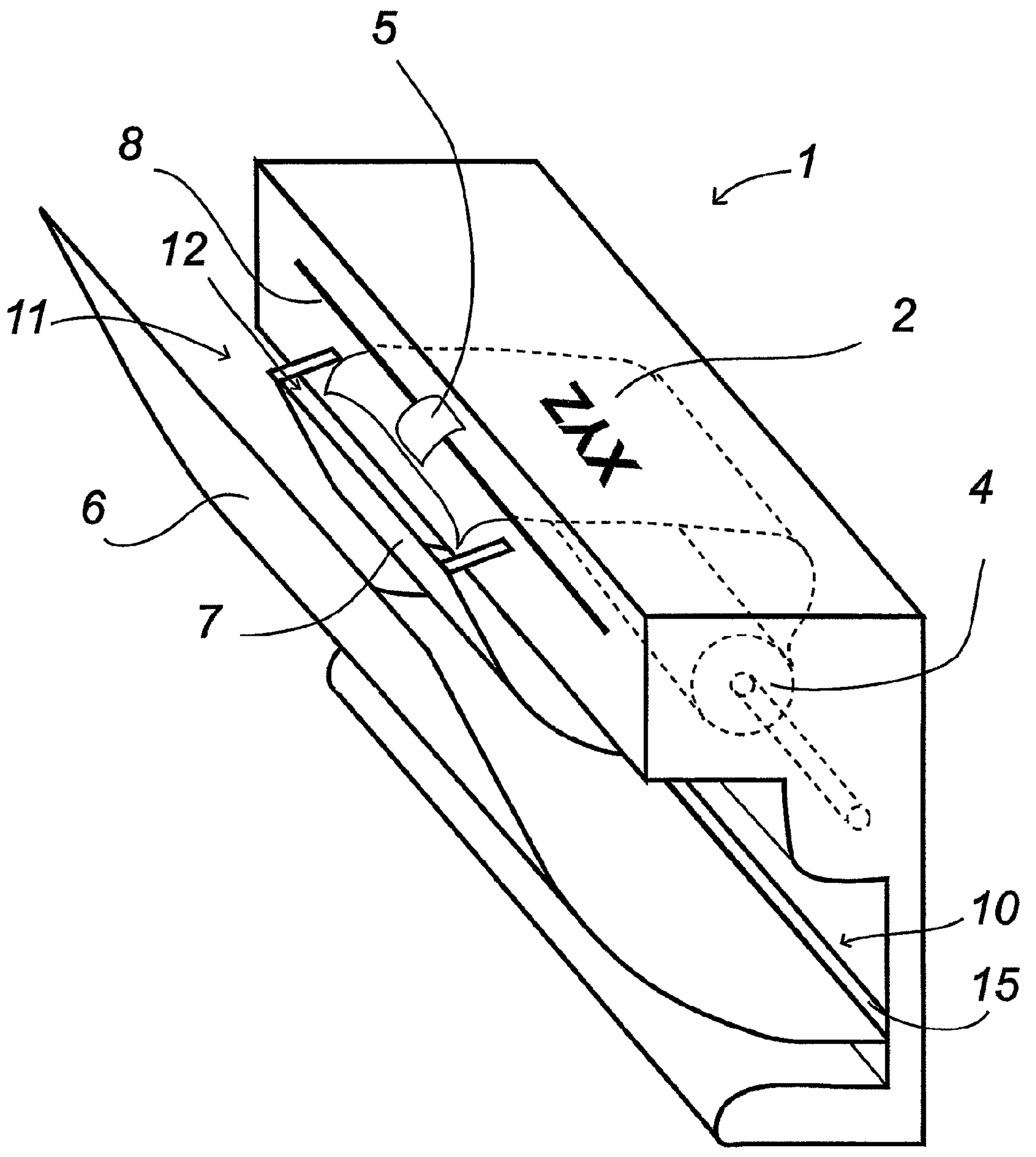
FIG. 5 illustrates the printing system of FIGS. 1-4, processing a different sized media.

FIG. 5 shows the printing system of FIGS. 1-4, processing a different sized media. In this case, the printing system 1 has been furnished with a roll of print media with a smaller width than the media of FIGS. 1-4. Typically, the media has a width equal to the length of a DIN-A3 sized sheet. After applying the image to the media the media is cut to appropriate length by a printer controlled knife (not shown).

The processed media exits the processing section of the system via the media output 8, and a passive urging device 5 urges the processed media downwards. The processed media first encounters the entrance 12 of the second delivery station 7 (second media chute). Since the processed media has an appropriate width to enter into the entrance 12, the processed media is guided into the entrance 12 of the second delivery station 7 (second media chute) as shown in FIG. 5.

The first and second media chutes (first and second delivery stations 6, 7) are bent sheet metal structures, formed to provide a reliable sliding movement from the entrance to the user-reachable delivery position. Alternatively the first and second media chutes (first and second delivery stations 6, 7) may be constructed as wire-structures.

Figure 6:
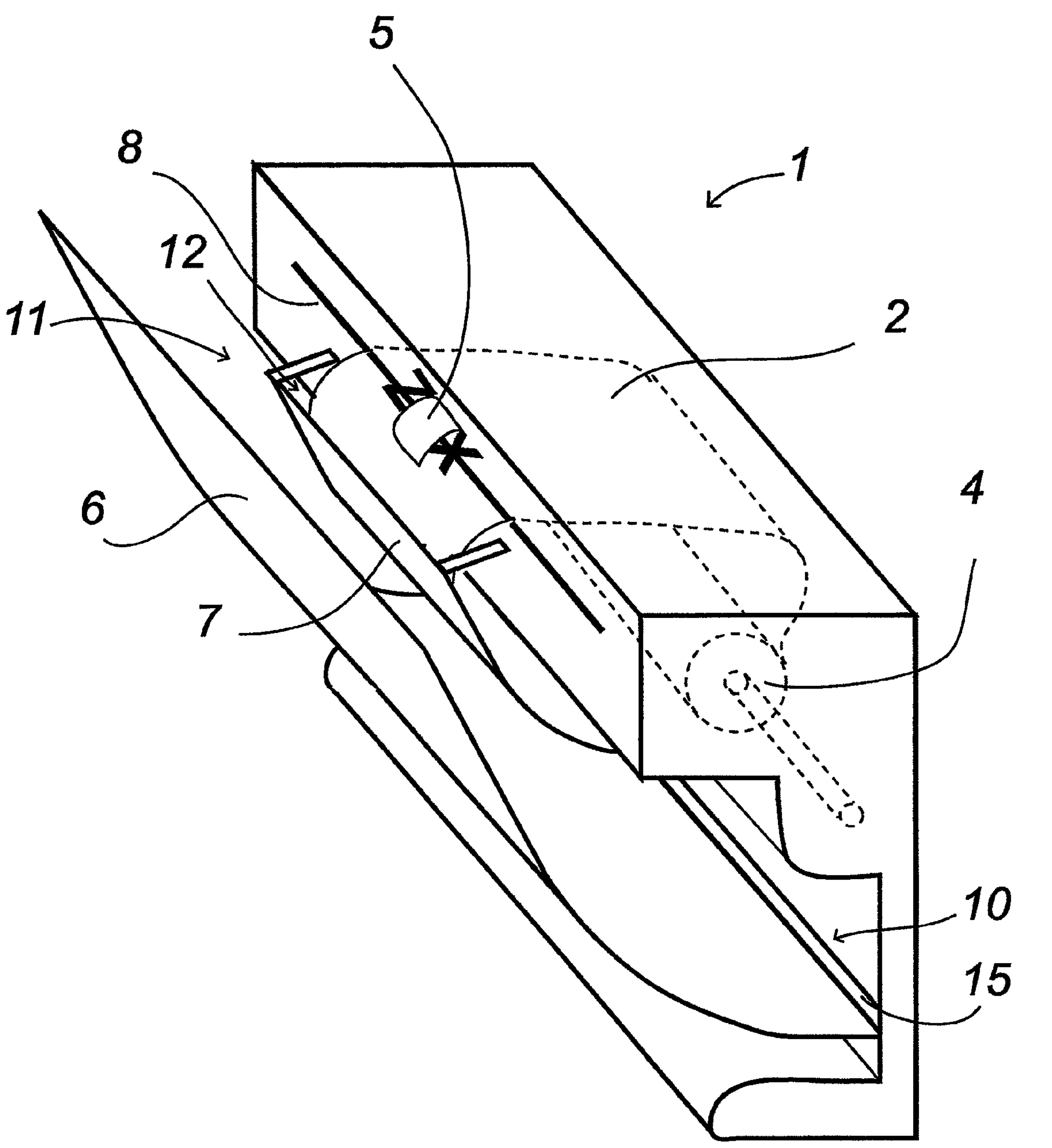
FIG. 6 illustrates how the processed media is released into a second media chute.

FIG. 6 shows how the processed media is released into the second media chute 7 via the entrance 12. The processed media slides through the second delivery station 7 (second media chute) towards an abutment (not shown, but similar to the abutment 15 in the first delivery station 6). The abutment engages with the leading edge of the processed media and stops the sliding of the processed media at a user-reachable delivery position. During its slide through the first delivery station 7 (second media chute), media deceleration mechanisms (not shown), positioned throughout the chute, slow the sliding movement of the processed media down such that the leading edge of the processed media is not damaged when the leading edge engages with the abutment.

The user-reachable delivery position of the second delivery station 7 (second media chute) is a position slightly above the user-reachable delivery position of the first delivery station 6 (first media chute) at the same side of the printing system. Alternatively, the delivery positions may be at more remote locations of the printing system 1 or the user-reachable delivery position may be the same for both the first and second delivery stations 6, 7 (first and second media chutes). The latter may be accomplished by decelerating the motion of the processed media in the entrance portion of the chute and shorten the second delivery station 7 (second media chute) such that the slowed down media slides into the second half portion of the first delivery station 6 (first media chute), sliding further towards the same user-reachable delivery position 10.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An imaging system, comprising:

an imaging station for processing a media, the imaging station comprising:

a media output for outputting a processed media;

a first media delivery station having a first media entrance;

a second media delivery station having a second media entrance; and a passive urging device, wherein the second media entrance has a width smaller than a width of the first media entrance, wherein both the first media entrance and the second media entrance are positioned downstream from the media output, the second media entrance is positioned upstream from the first media entrance, and the passive urging device is positioned downstream from the media output such that the media is urged towards the second media entrance.

2. The imaging system according to claim 1, wherein the passive urging device is positioned adjacent to the second media entrance.

3. The imaging system according to claim 1, wherein the passive urging device comprises a flap.

4. The imaging system according to claim 3, wherein the base of the flap is positioned above the media output and adapted to impose a force on the processed media directed substantially towards the second media entrance.

5. The imaging system according to claim 1, wherein the width of the second media entrance is defined by a guiding device, such that processed media with a width larger than the width of the second media entrance is guided towards the first media entrance.

6. The imaging system according to claim 1, wherein the first media delivery station comprises a first chute extending substantially from the media output towards a user-reachable delivery position.

7. The imaging system according to claim 6, wherein the second media delivery station comprises a second chute, extending substantially from the media output towards the user-reachable delivery position.

8. The imaging system according to claim 1, wherein the first and second media delivery stations comprise media deceleration devices that reduce the sliding motion of the processed media.

9. The imaging system according to claim 8, wherein the media deceleration devices are constructed such that an amount of deceleration in the first media delivery station is substantially different from an amount of deceleration in the second media delivery station.

10. The imaging system according to claim 9, wherein the media deceleration devices for the first media delivery station are constructed to provide more deceleration than the media deceleration devices for the second media delivery station.

11. The imaging system according to claim 1, wherein the second media entrance is constructed to receive processed media up to and including DIN-A3 format.

12. The imaging system according to claim 1, wherein the first and second media delivery stations are positioned below the imaging station in normal operation.

13. The imaging system according to claim 1, wherein the imaging station is a printing station for applying marking material in an image-wise fashion to the media.

14. The imaging system according to claim 1, wherein the imaging station is a scanning station for recording an image on the media.

* * * * *